June 9, 1953
C. OBERLIN
2,641,174
APPARATUS FOR STORING HAY
Filed Sept. 29, 1948
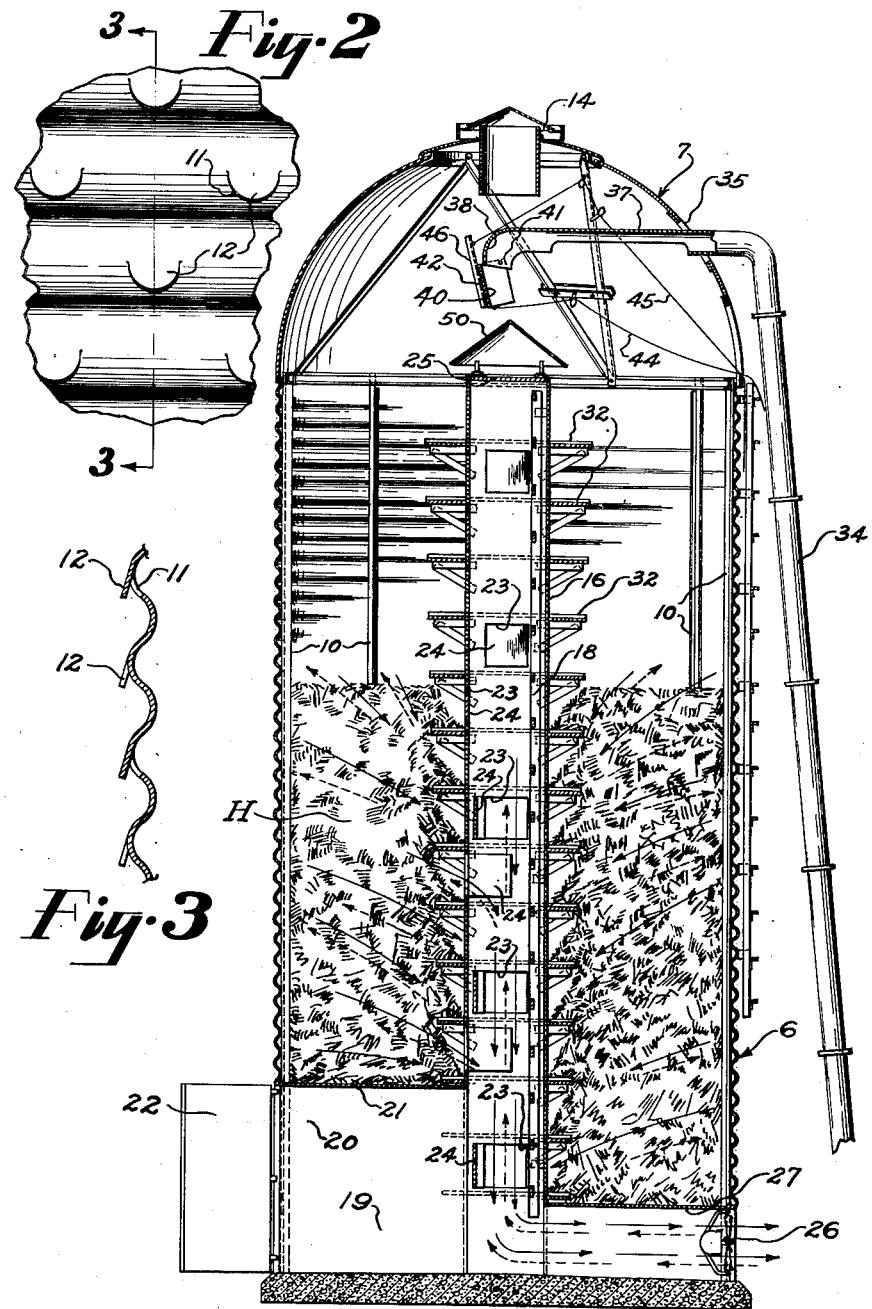
INVENTOR.
CARL OBERLIN
BY Fay, Golrick & Fay
ATTORNEYS

UNITED STATES PATENT OFFICE 2,641,174

APPARATUS FOR STORING HAY

Carl Oberlin, Mansfield, Ohio

Application September 29, 1948, Serial No. 51,703

3 Claims. (Cl. 98—54)

The present invention relates to apparatus for storing hay having a relatively high moisture content at the time the hay is placed in storage.

An object of the present invention is to provide means for storing relatively moist hay in large quantities whereby the moisture content may be reduced after the hay is placed in storage without subsequent loss of hay occurring from molding or spoilage by reason of incomplete drying or non-uniformity in drying.

A further object of the invention is to provide a structure for storing and curing hay in which means are provided for causing drying air to flow principally laterally through the hay throughout the entire depth thereof and through paths that are of uniform length whereby no area of hay will present more resistance to air flow than other areas.

Still another object of the invention is to provide a hay storage structure by which hay may be deposited in a shelter structure in a uniform repose without manual handling and in a condition most suitable for the passage of air therethrough.

Other objects and advantages of the invention will be apparent from the following detailed description of a preferred form of the invention, reference being made to the accompanying drawings wherein:

Fig. 1 is a longitudinal sectional view of a hay storage structure embodying my invention;

Fig. 2 is a fragmentary view in elevation of a section of the wall of the hay storage structure, the wall being shown on a larger scale than in Fig. 1; and, Fig. 3 is a view in section taken on line 3—3 of Fig. 2.

It is known that the food value of hay is greatly reduced by permitting the cut hay to lie in the field and to be dried by the sun and air to a degree at which the hay can be safely stored in the usual lofts without spoilage or spontaneous combustion. When the hay is thus dried there is not only deterioration in quality of food value, but in addition a considerable portion of the leaves break off and are lost in handling the dry hay in transferring the hay from the field to the barn and from the hay loft to the feed trough. In order to retain as much food value in hay as possible, it has been proposed that the hay be placed in storage when it is in a wilted state and before it has been subjected to the leaching and drying necessary to reduce the moisture content for safe storage and to then complete the drying of the hay while it is in storage.

Heretofore it has been proposed to store partially cured chopped hay in a mow provided with air ducts extending along the floor and arranged to discharge air into the hay at intervals therealong for the purpose of drying the hay. This method of curing has been found to be unsatisfactory because hay tends to repose in layers in such a manner that there is less resistance to flow of air laterally than vertically and, therefore, the upper portions of the hay more or less remote from the air ducts would not be aerated to properly cure the hay resulting in spoilage or spontaneous combustion. Furthermore, it was necessary to spread the hay evenly for proper drying of the portion receiving sufficient air and this spreading required manual handling of the hay which was laborious, inefficient and the weight of the handlers would pack some areas of the hay and create uneven resistance to air flow whereby these areas would be deprived of air.

The present invention contemplates a structure whereby the hay is evenly stacked in a cylindrical form by a spreader device and air is introduced into the cylindrical body of hay through a vertically extending column in the axial portion of the cylinder so that the air will travel laterally throughout the entire depth of the hay and the distance of air travel through the hay will be uniform through all areas of the hay and the resistance to air flow will also be uniform thus assuring complete and efficient curing of the hay.

Referring now to the drawings, I have shown a hay storage structure which comprises a base 5, which is preferably formed of cement, and on the base there is a cylindrical structure 6 having a domed top 7. Preferably, the walls of the cylinder 6 are formed of arcuate sheets of corrugated metal suitably attached to the vertical frame members 10 anchored to the base 5. It will be understood, however, that other suitable material could be used for forming the walls of the cylinder. The walls of the cylinder are perforated throughout their entire area for the passage of air therethrough and in the present embodiment these perforations are formed by arcuate piercings 11 with the material enclosed by the arc being pressed outwardly to form louvers as indicated at 12 in Figs. 2 and 3. These perforations and louvers are not shown in Fig. 1 as they are too small to show. The dome 7 is preferably formed of sheet metal segments which are imperforate for closing the top of the cylinder to the weather. Preferably, a ventilator structure 14 is mounted in the top of the dome.

A vertically extending chute for forming an air conduit is erected centrally of the cylinder, and in the present form of the invention this chute is formed square in cross section and it extends upwardly to a level with the base of the dome 7. The chute may be formed of a suitable frame, not shown, with boards tongued and grooved and attached to the frame to form a substantially airtight wall structure. The size of the chute is preferably large enough so that it can be traversed by a person and a ladder 18 is provided for this purpose. Entrance is had to the chute through a passage 19 which extends from the base of the chute to the exterior of the cylinder 6, the passageway having side walls 20, only one of which is shown, and a top wall 21. A door 22 is provided which when closed substantially seals the passage 19 from the entrance of air therethrough.

Openings 23 are formed at intervals longitudinally of the chute 16 and these openings are adapted to be selectively closed by valve means in the form of doors 24 which are hinged to swing inwardly of the chute. Preferably, means are provided for latching the doors in open or closed positions, but these latching means are not shown here. The top of the chute is closed by a door 25 which may be opened to gain access to the area above the chute, if desired.

Air is adapted to be exhausted from or blown into the chute 16 by a fan 26 which is mounted in a tunnel 27 leading from the base of the chute to the exterior of the cylindrical structure 6. Although I have shown the tunnel 27 located at the base of the storage structure and opposite the door 22, it is to be understood that the tunnel may be located at any position desired.

Preferably, a series of platforms 32 are provided on the exterior of the chute 16 which surround the chute above and below the openings 23 so that when the hay, shown at H, is discharged into the structure the platforms 32 will cause annular passages to be formed surrounding the chute, which passages are in communication with the openings 23, the advantage of which will be apparent as the description of the operation is disclosed.

The chopped hay is adapted to be blown into the top of the storage structure through a pipe 34 which extends laterally into the structure through an opening 35, which opening is adapted to be closed by a suitable door structure, not shown. The top lateral portion of the pipe 34, as indicated at 37, is open along the bottom thereof and the outer end of the laterally extending portion is turned downwardly as at 38 for directing the hay blown from the pipe downwardly. A U-shaped deflector 40 is pivotally attached to the portion 38 of the pipe at 41, with the yoke 42 of the deflector lying in the same general plane as the wall of the downwardly extending pipe portion 38. The deflector 40 may be swung in a vertical plane by ropes 44 and 45, the rope 44 being attached to the lower part of the deflector 40 and the rope 45 being attached to an arm 46 secured to the yoke 42 of the deflector. The ropes extend through sheaves and to the outside of the structure 6 where they may be manipulated and secured to properly locate the deflector.

Located directly below the deflector 40 is a cone shaped spreader 50 which is mounted to the top of chute 16, the cone 50 serving to direct the hay being blown thereupon in a radial direction relative to the axis of the chute so that the force with which the hay is discharged from pipe 34 is broken by the cone and the chopped hay will fall by the force of gravity evenly about the center chute. The deflector 40 can be adjusted from time to time so that even distribution of hay about the center chute can be effected.

In harvesting the hay, it is preferably permitted to dry in the field after it is cut until the water content is between 30 and 45% and in this condition the hay has a wilted appearance. Normally, under sunny conditions this drying can be done in three to four hours. The hay is then picked up and chopped into pieces which may be conveniently blown through a pipe. The hay is then put through a blower of conventional design, not shown, to which the pipe 34 is attached, and the hay is thereby blown into the top of the structure and discharged principally on to the cone 50. By adjusting the position of the deflector 40 the hay will descend by a floating action into the cylindrical structure uniformly about the chute 16 so that the level of the stored hay will remain even and the density of the hay will be uniform throughout. By breaking the force of the blown hay and scattering the chopped pieces, the hay reposes in a loose condition which enables penetration of air through the mass of hay.

After the hay has been disposed within the structure all of the doors 24 commencing several feet beneath the top surface of the hay are opened, while the remaining doors, including doors 22 and 25, are closed and the blower 26 is then placed in operation, and for example, it may operate to exhaust air from the chute 16. This causes air to enter the perforations 11 in the walls of the structure and pass through the hay through openings 23 in the conduit 16 and downwardly and out into the atmosphere as is indicated by the solid line arrows. Since the hay is of uniform density throughout air will pass uniformly through the entire mass and remove moisture therefrom. The annular passages formed under the platforms 32 surrounding the center chute form plenum chambers so that the length of air travel through the hay to the chute 16 is substantially equal from all sides of the cylinder 6. The blower 26 is maintained in operation until the moisture content of the hay is in the neighborhood of 20% which is suitable for storage.

If desirable, the blower 26 may force air into the conduit 16 and in that event the air will pass outwardly through openings 23 through the hay and out the perforations 11 in the walls of the structure as indicated by the dotted arrows.

Uncured hay may be later filled on top of the cured hay and by opening the doors in the chute in the area of the moist hay and operating the blower, the moisture may be removed from the uncured hay.

By my invention I have provided means of harvesting and storing hay which maintains a maximum of food value in the hay and which cures the hay in its storage structure without loss due to spoilage and the dangers of spontaneous combustion are eliminated. It has been found that cattle, for example, show a marked preference for hay stored as disclosed herein over other types of stored feed and during the months in which grazing is not possible for milk cows, milk production can be maintained by feeding this type of cured hay with unusually small supplementary grain feed.

Although I have described but one form of the invention it is to be understood that other forms may be adopted, all falling within the scope of the claims which follow.

I claim:
1. A structure for storing hay having an exterior wall formed of a single thickness of sheet metal forming a vertical enclosure for receiving and retaining chopped hay in a vertical column, said wall being perforated throughout for the passage of air from the interior of the enclosure directly to atmosphere at all levels; a vertical air conduit centrally disposed in said enclosure, said conduit having longitudinally spaced openings in the walls thereof for the passage of air therethrough; valve means for selectively closing said openings; means for conveying chopped hay into the enclosure discharging the hay radially with respect to the vertical axis of said air conduit whereby the hay will fall substantially solely by force of gravity into the enclosure and surround said conduit, and air impelling means for circulating air vertically through the centrally disposed air conduit and laterally through the hay column and wall.

2. A structure for storing hay having an exterior wall formed of a single thickness of sheet metal forming a vertical enclosure for receiving and retaining chopped hay in a vertical column, said wall being perforated throughout for the passage of air from the interior of the enclosure directly to the atmosphere at all levels thereof; a vertical air conduit centrally disposed in said enclosure, said conduit having longitudinally spaced openings in the walls thereof for the passage of air therethrough; valve means for selectively closing said openings; conveyor means for discharging chopped hay into the central portion of said enclosure above the air conduit; baffle means for intercepting the discharged hay and directing said hay radially with respect to the vertical axis of said air conduit, and air impelling means for circulating air laterally through the storage container between the wall of the container and the conduit openings.

3. A structure for storing hay having an exterior wall formed of a single thickness of sheet metal forming a vertical enclosure for receiving and retaining chopped hay in a vertical column, said wall being perforated throughout for the passage of air from the interior of the enclosure directly to the atmosphere at all levels thereof; a vertical air conduit centrally disposed in said enclosure, said conduit having longitudinally spaced openings in the walls thereof for the passage of air therethrough; valve means for selectively closing said openings; a cone shape deflector mounted above the upper end of said conduit; conveyor means for discharging chopped hay onto the top of said deflector, and air impelling means for circulating air laterally through the vertical enclosure between the enclosure wall and the conduit openings.

CARL OBERLIN.

References Cited in the file of this patent

UNITED STATES PATENTS

| Number | Name | Date |
|---|---|---|
| 1,219,267 | Dickelman | Mar. 13, 1917 |
| 1,560,713 | Nelson | Nov. 10, 1925 |
| 1,863,109 | Graves | June 14, 1932 |
| 1,929,084 | Strub | Oct. 3, 1933 |
| 1,981,436 | Shodron | Nov. 20, 1934 |
| 1,995,551 | Shodron | Mar. 26, 1935 |
| 2,014,594 | Shodron | Sept. 17, 1935 |